Nov. 11, 1952          G. A. FINK          2,617,842

AUTOMATIC REBALANCE SIGNAL INDICATOR

Filed Nov. 5, 1948

INVENTOR
GEORGE A. FINK
BY A. John Michel
ATTORNEY

Patented Nov. 11, 1952

2,617,842

UNITED STATES PATENT OFFICE 2,617,842

AUTOMATIC REBALANCE SIGNAL INDICATOR

George A. Fink, Flushing, N. Y.

Application November 5, 1948, Serial No. 58,410

1 Claim. (Cl. 171—95)

The present invention relates to signal indicators, that is, to devices wherein an indicating element (e. g. a pointer or a stylus) is controlled in accordance with the magnitude of an electrical variable (e. g. voltage) applied to the device.

An object of the present invention is to provide a signal indicator wherein the indicating element will follow faithfully and accurately any change in the input variable more rapidly than in known indicators by supplying more power, in a controlled way, than is available in the input signal.

A further object of this invention is to provide a signal indicator having the advantages set forth above while being adapted for use with signals of very low and zero frequency.

Still another object of this invention is to provide a signal indicator adapted to have a response characteristic following any desired law.

According to the invention, I mechanically connect an electro-mechanical actuating means, such as a moving coil and magnetic field assembly, to an indicating element, such as a pointer or recording stylus, or both, and to a voltage-generating element, such as a potentiometer, capable of generating an electrical voltage which is some desired function of the position of said voltage-generating element, or of one of its parts. The electrical input terminals of the actuating means are connected to the output terminals of an electrical power amplifier. The voltage-generating element is connected to one of the input terminals of the indicator, which terminal may well be grounded. The other input terminal of the amplifier is connected to the other input terminal of the indicator.

Where the changes of the input variable are slow or intermittent, the indicating element may be in the nature of a pointer giving a visual indication of the instantaneous value of this voltage. Again, where the input voltage is subject to relatively rapid variations which the human eye is unable to follow, the indicating element may be in the nature of a stylus producing a conveniently interpretable record of these variations. Furthermore, this element may be constructed as a mechanically movable member cooperating with a scale, recording surface, or the like, or it may comprise other conventional indicating means. I have found that the speed of response of an indicator may be greatly increased, while retaining or improving accuracy, if the moving element of the indicator is powered, not by the signal alone, but by an amplifier excited by the difference of the signal input voltage and a voltage, generated by an element of the indicator, proportioned to the amount of movement of the moving system of the indicator. If the moving element of the indicator were powered by the signal and an amplifier alone, the speed of response would be increased to the extent that a given position of the indicator would be reached more quickly with the same signal input, but the final displacement of the indicator from zero would also be greater, and this final position would be reached no more quickly than without amplification. In other words, sensitivity only would be increased, without shortening the time required to reach an equilibrium position.

The above and other features and objects of my invention will be apparent from the following description of certain embodiments thereof, reference being had to the accompanying drawing in which.

Figure 1:
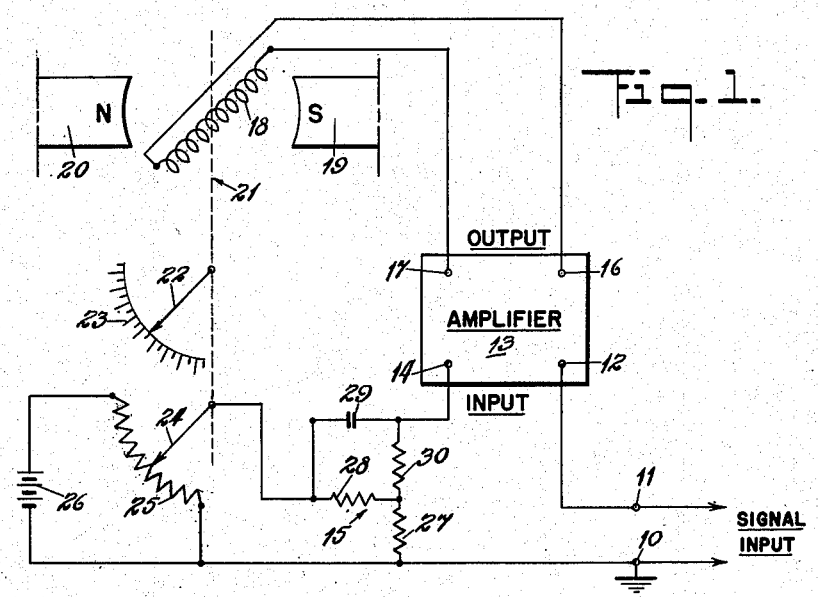
Fig. 1 shows diagrammatically a circuit arrangement illustrating one form of the invention.

Referring now to Fig. 1, there is shown a pair of signal input terminals 10 and 11, one of which is grounded and the other of which is connected to one of the input terminals, 12, of the amplifier 13. The other input terminal, 14, of the amplifier is connected to a network 15. The output terminals 16 and 17 of amplifier 13 are connected to an electromagnetic coil 18 which is pivotally suspended in the field of a magnet having north and south poles indicated by 20 and 19, respectively. The coil 18 and magnet poles 19 and 20 constitute, essentially, an ammeter arrangement as will be readily understood. Coupled mechanically with the coil 18, as indicated schematically at 21, is the wiper 24 of a potentiometer 25 connected across a source of current 26, shown here schematically as a battery.

The variable voltage tapped off at the wiper 24 is applied to the amplifier input through network 15 consisting of a pair of voltage-dividing resistors 27 and 28, a capacitor 29 connecting the wiper to the amplifier input terminal 14, and a resistor 30 connecting terminal 14 to the junction of resistors 27 and 28.

Assume, for example, that the potential applied to terminal 11, relative to terminal 10, varies in a positive direction. The output current of amplifier 13 will increase in what may be called the positive direction, and this output current passing through coil 18 will tend to rotate it in a clockwise direction as viewed in Fig. 1. Wiper 24, likewise rotating clockwise, will deliver an increasing positive potential through network 15 to terminal 14 of amplifier 13 which is arranged to be sensitive to differences of potential between its input terminals, but not sensitive to changes of potential common to both terminals. If the signal voltage applied to the terminals 10, 11 is within the range of the indicator, the voltage from 24 will, by motion of the system 18, 21, 22, 24, become equal to the signal voltage. If wiper 24 were connected directly to amplifier 13 without the network 15, the difference voltage applied to the amplifier would then be zero, and the output current from the amplifier would also be zero, so that the coil would no longer be driven by electrodynamic forces. However, owing to inertia, the system 18, 21, 22, 24 would overshoot this position in which the net amplifier input is zero. The voltage from 24 would then exceed the signal voltage and the difference voltage at the amplifier input would reverse, and the output current from the amplifier would also reverse. This reversed current through coil 18 would eventually stop the overswing and reverse it, bringing the system back to the equilibrium position, about which it will oscillate.

By proper "tapering" of the resistance of the potentiometer 25 it is possible to make the balancing voltage from the potentiometer follow some desired relation to the rotation of the indicator other than a linear relation. Thus, for example, if the angle of rotation of the wiper 24 of potentiometer 25 is made proportional to the logarithm of the voltage produced by it (above some minimum value of resistance and voltage to avoid the difficulty of trying to find the logarithm of zero), the response of the indicator will be proportional to the logarithm of the signal input, above a minimum indication corresponding to the minimum voltage mentioned above, below which the response may conveniently be made linear.

Figure 2:
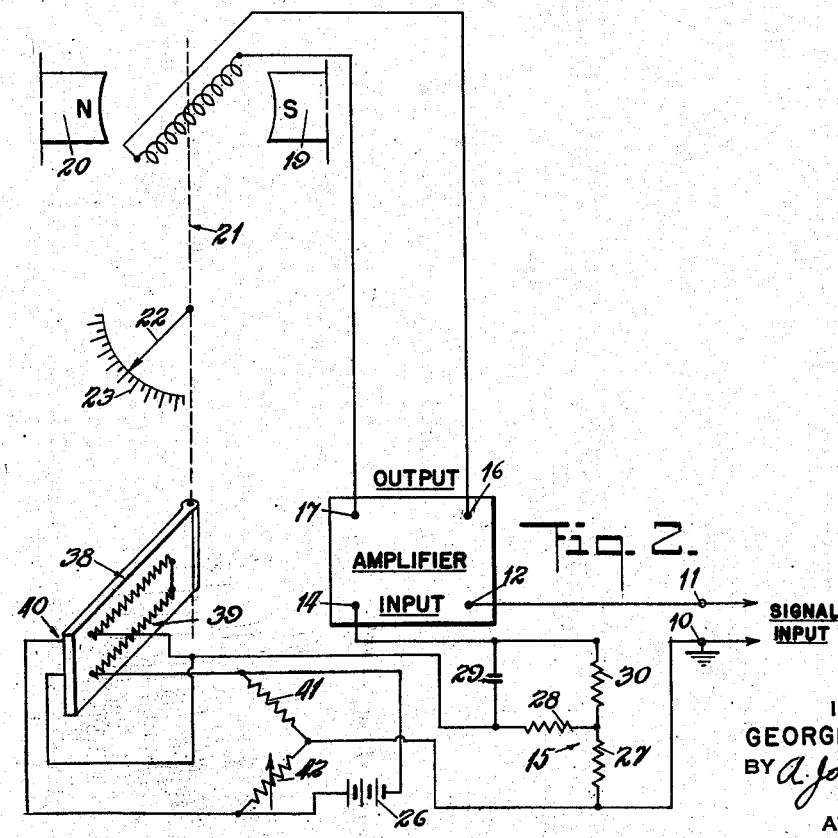
Fig. 2 illustrates the preferred form of the invention.

Fig. 2 shows another embodiment of my invention in which the friction of the potentiometer is eliminated without losing the ability to respond to signals of low and zero frequency. This system contains all the elements of the system of Fig. 1 except potentiometer 25 with its wiper 24. In place of this potentiometer I provide an elastic member 38, in the form of a flat thin strip on whose major surfaces wires 39, 40 are fastened (wire 40, on the far side of strip 38, is not shown in the figure). The outer end of the strip 38 is fixed so that rotation of the system 18, 21, 22, will bend the strip so that one side is elongated and the other side is shortened. If the wires are securely cemented to the surfaces of the strip they will be subjected to the same strains of enlongation and compression. The material of the wires is chosen to have a large coefficient of change of resistance with state of strain. Then bending of the strip will cause an increase of the resistance of the wire on one side and a decrease of the resistance of the wire on the other side.

Wires 39 and 40 are connected as two arms of a Wheatstone bridge; the other two arms being resistors 41 and 42, one of which is varied to adjust the bridge to balance. If the bridge is balanced when the moving system of the indicator is in its zero or equilibrium position, then the resistance changes due to rotation of the moving system will result in the unbalancing of the bridge. When the bridge is supplied with a constant voltage, as by the battery 26, the unbalancing of the bridge will produce an output voltage across the corners of the bridge, which are the junctions of 39 and 40 and of 41 and 42, approximately proportional to the angle of rotation of the indicator.

The bridge output is combined with the signal input so that the amplifier input is the difference of these two voltages. To every value of input voltage within the range of the indicator there will correspond a position of the moving system of the indicator, and a state of strain of the elastic member 38, giving rise to values of resistances 39 hence to 40, and an unbalance voltage from the bridge, such that the output voltage from the bridge will equal the input voltage. Thus the operation of the system is similar to that of Fig. 1, except for the elimination of friction and the introduction of an elastic restoring force due to bending of member 38. This elastic force will reduce the indicator sensitivity slightly since a slightly greater input voltage will be necessary to hold the system in a position where the elastic member is bent, because some output current from the amplifier through the coil 18 will be necessary to overcome the elastic restoring force. This reduction of sensitivity is of little importance since the overall sensitivity of the indicator may be varied over a wide range by changes in the voltage applied to the Wheatstone bridge, by changes in the values of the resistances in the bridge, and by changes in the size and shape of the elastic member.

While the invention has been described with reference to certain specific embodiments, it is to be understood that the same have been given merely by way of illustration, and not as a limitation upon the scope of the invention as defined in the appended claim.

What is claimed is:

A signal indicator of the follow-back type, comprising input terminals to which a source of signal voltage to be indicated may be connected, an amplifier, circuit means connecting said input terminals across the input of said amplifier, said circuit means including a feedback network comprising a Wheatstone bridge circuit and a voltage source connected across a diagonal of said bridge circuit, an electromechanical device connected across the output of said amplifier and including a displaceable member controlled by the current in said output, and a resistance element having a strain-dependent resistivity and forming part of at least one arm of said bridge circuit, said resistance element being mechanically connected with said displaceable member for deformation upon displacement of the latter.

GEORGE A. FINK.

REFERENCES CITED

The following references are of record in the file of this patent:

UNITED STATES PATENTS

| Number | Name | Date |
|---|---|---|
| 2,117,894 | Lenehan | May 17, 1938 |
| 2,151,474 | Johnson | Mar. 21, 1939 |
| 2,300,742 | Harrison et al. | Nov. 3, 1942 |
| 2,363,473 | Ryder | Nov. 21, 1944 |
| 2,403,521 | Gilbert | July 9, 1946 |
| 2,446,156 | Belcher | July 27, 1948 |
| 2,459,730 | Williams | Jan. 18, 1949 |
| 2,511,855 | Keck | June 20, 1950 |